Figures 1, 2:
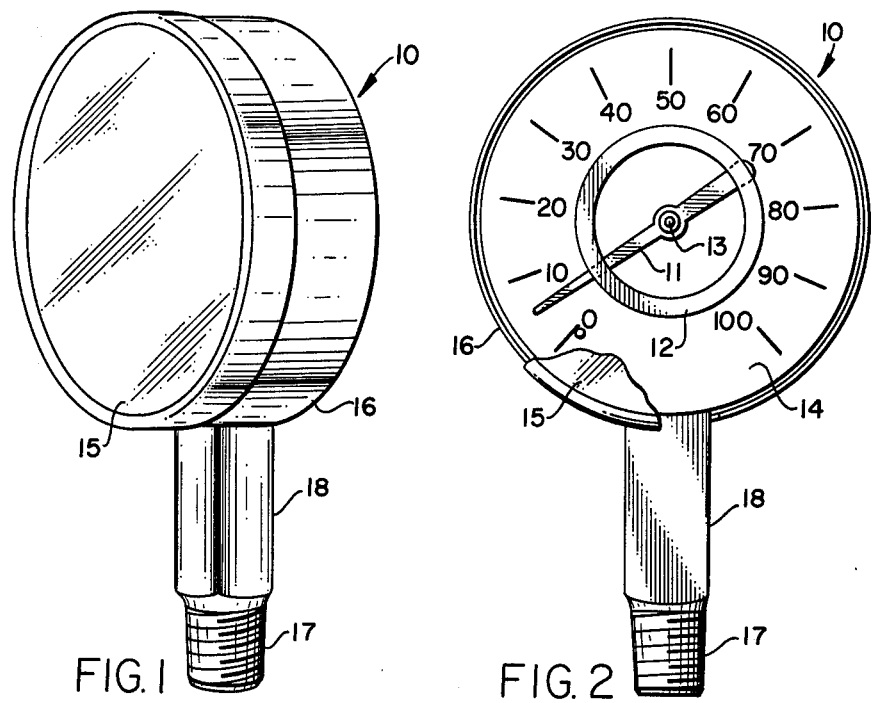

United States Patent [19]

Gray et al.

[11] 4,100,812
[45] Jul. 18, 1978

[54] DRY PRESSURE GAUGE WITH DAMPENED NEEDLE MOVEMENT

[75] Inventors: Tommy L. Gray, Dallas; Sam R. Crowe, Plano, both of Tex.

[73] Assignee: Span Instruments, Plano, Tex.

[21] Appl. No.: 757,035

[22] Filed: Jan. 5, 1977

[51] Int. Cl.² .............................................. G01L 7/04
[52] U.S. Cl. ...................................................... 73/732
[58] Field of Search ................ 73/411, 412, 413, 414, 73/415, 416, 417, 418, 432 A, 732; 116/DIG. 6, 136.5

[56] References Cited

U.S. PATENT DOCUMENTS

| | | | |
|---|---|---|---|
| 1,663,313 | 3/1928 | Motherwell | 73/411 |
| 1,801,778 | 4/1931 | MacGahan | 116/136.5 |
| 1,861,255 | 5/1932 | Arey | 116/136.5 |
| 1,865,082 | 6/1932 | Chrisman | 73/411 |
| 1,887,804 | 11/1932 | Faber | 73/412 |
| 3,214,979 | 11/1965 | Bissell et al. | 73/418 |

*Primary Examiner*—Donald O. Woodiel
*Attorney, Agent, or Firm*—Warren H. Kintzinger

[57] ABSTRACT

A dry pressure gauge with a circular spring interconnecting the operational movement end of the Bourdon tube sensor and the driven mechanism that includes added mass to dampen frequencies above a desired design level. The added mass takes the form of added weight on the gauge needle in the form of a circle of material, weights on opposite sides of the needle from the pivot center, or a single mass weight on the needle below the pivot center. Circular spring to mechanism interconnect slotting is included, normally biased to an end limit by a bias spring in the driven mechanism, to allow below connecting spring force movement between the sensor and the driven motion translator to reduce friction.

12 Claims, 9 Drawing Figures

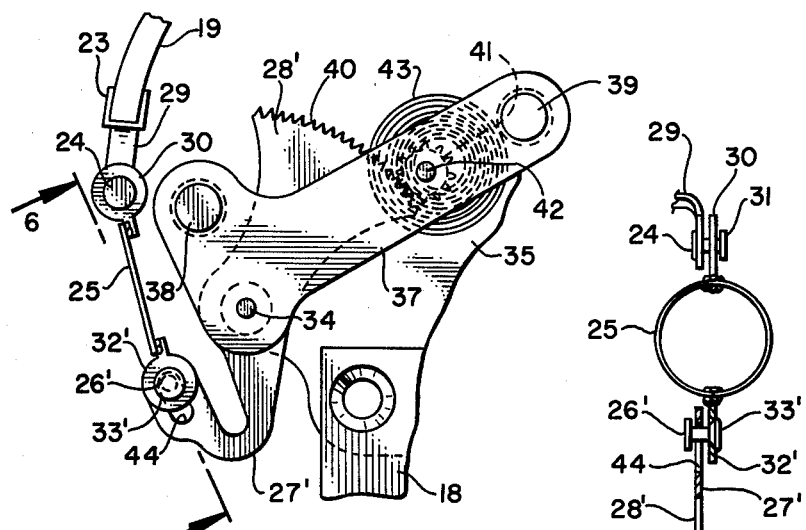
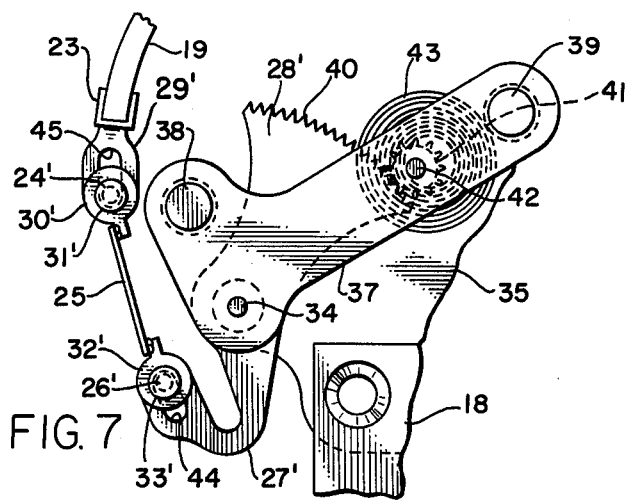
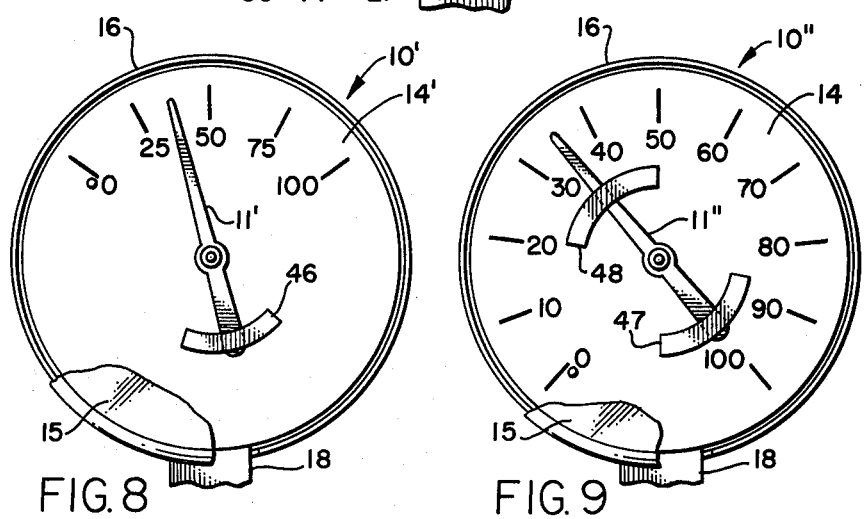

DRY PRESSURE GAUGE WITH DAMPENED NEEDLE MOVEMENT

This invention relates in general to dial pressure gauges, and in particular to dry pressure gauges with circular spring interconnect between the gauge sensor and the driven mechanism that includes added mass to dampen undesired pressure input frequency vibrations, and with circular spring to mechanism interconnect slotting.

In many operational environments the frequency of pressure variations transmitted to and through the Bourdon tube of a needle gauge is excessive leading to fast deterioration of such gauges. Dampening such vibration through the use of fluid in fluid filled gauges has been one approach to the problem, but this is an expensive approach coupled with problems of fluid handling in maintenance and repair of such gauges. Pressure indicating devices such as pressure gauges by nature require relatively low motion of sensor to indication mechanism. In the case of Bourdon or spiral tube driven pressure indicators a sensor rotation typically of 7° will produce 270° of gauge indicator movement. Thus, a one percent change in connection length between sensor and indicator would result in a 4.5 percent start from zero error, which is beyond the total allowable for precision pressure sensing gauges.

Prior art gauges employing a helical coiled spring as a dampening interconnect between the gauge sensor and driven mechanism are more subject to temperature change induced error than desired, and gauges using opposing spring configurations tend to float about a neutral point. Further, many gauges with configurations designed to maintain a substantially uniform spacing in mechanism drive linkage regardless of temperature variation tend to be difficult to manufacture with proper control and tend to be unstable under long term oscillation conditions. In addition translation of a linear movement to a rotary movement in pressure gauges utilizing low power sensors such as spiral or "C" tube configurations encounter low frequency pressure variation input gauge drive mechanism friction problems in connection of the sensor tip to the ratio mechanism with fixed distance linkages.

It is therefore a principal object of this invention to provide a dry pressure gauge with dampening of pressure variation frequencies above a design level.

Another object is to minimize temperature change induced distance variation through a sensor to driven mechanism interconnecting spring.

A further object is to reduce friction in interconnect of a motion translating spring connected between the gauge sensor and driven mechanism of the gauge.

Features of this invention useful in accomplishing the above objects include, in a dry pressure gauge with dampened needle movement, a circular spring interconnect between the gauge sensor and a driven mechanism that includes added mass to dampen undesired pressure input frequency vibrations. The added mass is added weight on the gauge needle in the form of a circle of material, or weights on opposite sides of the needle from the pivot center, or a single mass weight on the needle below the pivot center. The circular spring used as an interconnect is stable under long term acceleration as long as the material yield strength is not attained, and such a circular spring shape tends to maintain original shape even though stresses are relieved therefrom or imparted thereto. The circular spring interconnect structure is quite stable in both directions and has less temperature change induced distance variation through the spring connection than in other gauges employing coil spring and other spring structures. Circular spring to mechanism interconnect slotting is also included to allow low amplitude connecting spring force movement between the sensor and the driven motion translator with reduced friction at low frequencies.

Specific embodiments representing what is presently regarded as the best mode for carrying out the invention is illustrated in the accompanying drawings.

Figures 3, 4:
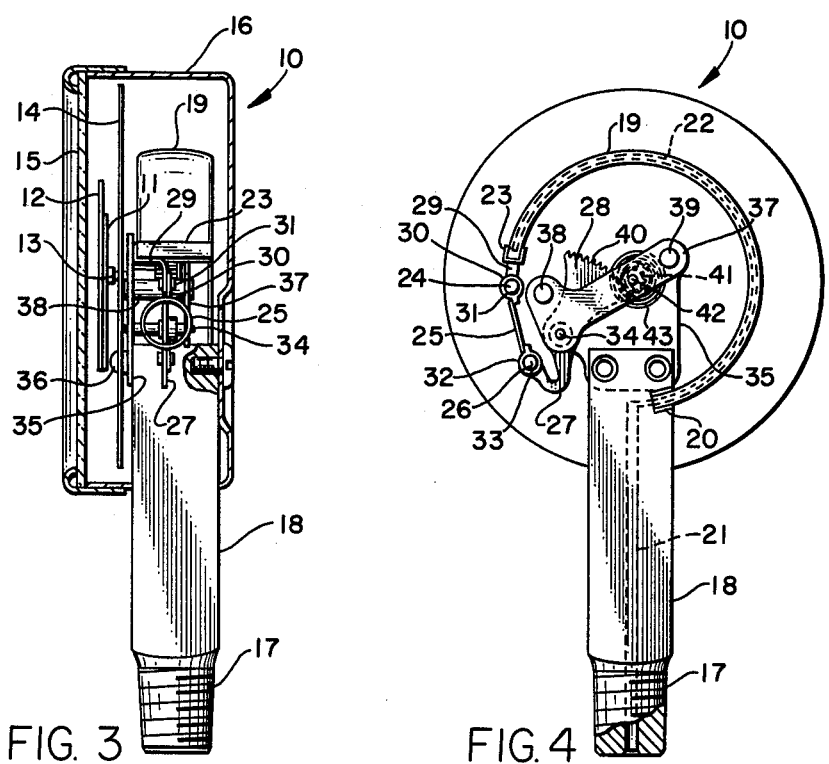

In the drawings:

FIG. 1 represents a perspective view of a pressure gauge with a weight mass increased needle indicator;

FIG. 2, a front elevation view of the pressure gauge of FIG. 1 showing the dial face and an annular weight mass mounted on the needle indicator;

FIG. 3, side elevation view partially broken away and sectioned showing gauge movement detail within the case;

FIG. 4, a rear elevation view of the gauge movement removed from the case;

FIG. 5, a partial enlarged view of Bourdon tube sensor and driven mechanism with circle spring interconnect detail including spring to mechanism slotting;

FIG. 6, a partial enlarged view of circle spring interconnect detail taken from line 6—6 of FIG. 5;

FIG. 7, a partial enlarged view similar to FIG. 5 showing circle spring interconnect detail with interconnect slotting connecting at both spring ends;

FIG. 8, a front elevation view similar to FIG. 2 showing an alternate weight mass mounting on the needle indicator of a limited displacement indicator gauge; and FIG. 9, a front elevation view of pressure gauge showing another needle indicator embodiment.

Referring to the drawings:

The dry pressure gauge 10 of FIGS. 1, 2 and 3 is shown to have a needle 11 with a circular mass weight 12 so mounted thereon as to be annular to the pivot center mounting 13 of needle 11. The needle 11 is the gauge 10 indicator over dial face 14 enclosed behind front window 15 of gauge case 16 from which threaded 17 stem mount 18 extends. Referring also to FIG. 4 the dry pressure gauge 10 is shown to include a "C" type Bourdon tube sensor 19 that has its mounting end braised (or welded) 20 in place in the portion of stem mount 18 extending to within the gauge case 16 in order for internal pressure fluid passage 21 in mount 18 to be in fluid communication with the hollow interior passage 22 of the Bourdon tube 19. The operational movement end 23 of the Bourdon tube sensor 19 has a pivot pin 24 pivotal connection to a substantially circular spring 25 the opposite side (or end) of which has a pivot pin 26 pivotal connection to a connection arm 27 of gear sector member 28. Pivot pin 24 is fixed to a connection arm 29 extending from end 23 of sensor 19 and pivotally mounts a pierced tab member 30, retained thereon between arm 29 and an enlarged head 31 on pin 24, fastened as by solder (or welding) to one end of circular spring 25. The opposite end of circular spring 25 is fastened as by solder to a pierced tab member 32, retained on pivot pin 26 that is fixed to connection arm 27 between the arm 27 and an enlarged head 33 on pin 28. The gear sector member 28 is pivotally mounted by pivot pin 34 that extends between pivot mount in mechanism support plate 35, that is assembled to stem mount 18 along with the disc of dial face 14 as by two pins 36, and pivot mount in mechanism frame plate 37. Frame plate 37 is mounted in spaced parallel relation to plate 35 by interconnect frame pins 38 and 39 staked to the plates 35 and 37 at opposite ends.

The gear sector 40 of gear sector member 28 effectively transmits gauge needle 11 meshed driving movement to pinion gear 41 mounted on the needle 11 mounting arbor 42 journaled at pivot center mounting 13 in mechanism support plate 35 and frame plate 37. A mechanism bias spring 43 is mounted on arbor 42 with one end connected to frame pin 39 to bias the gauge needle drive mechanism in one direction and minimize space play error. This gauge structure does not have dampening of the Bourdon tube sensor 19, however, rapid higher frequency movement of the tube 19 is absorbed by the circular spring 25 without such harsh jaring movement being transmitted to the needle drive, particularly with dampening by mass of the drive movement structure as aided by additional mass added to the needle. In at least some respects a circle is the most stable shape for the spring 25 since a circular spring is substantially uniform in both directions within its elastic limits. Expansion changes due to temperature variation are substantially linear with temperature variation induced diameter change between two points fixed 180° apart on spring 25 and are generally of less magnitude than with coil spring interconnect between a gauge sensor and indicator driving mechanism. Mechanism bias spring 43 is a hairspring type spring of materially less spring rate than circular spring 25 so as to not materially distort spring 25 nor override the normal indicating movement of the Bourdon tube sensor 19. Further, the annular mass weight 12 is advantageously of greater diameter than lesser diameter so as to optimize the mass torque effect with minimum weight and keep weight on the journal bearing mounting of the needle 11 mounting arbor 42 minimized.

The circular spring 25 and drive mechanism interconnect are altered as shown in FIGS. 5 and 6 to include a slot 44 in arm 27' of gear sector member 28' that is otherwise the gear sector member 28 of FIG. 4. Parts of structure in the embodiments of FIGS. 5, 6 and 7 the same as in the embodiment of FIGS. 1—4 are numbered the same, those similar are given primed identification numbers and those that are different are given new numbers. With the embodiment of FIGS. 5 and 6 the pivot pin 24 pivotal connection to circular spring 25 is the same as with the embodiment of FIGS. 1-4. The lower pivot pin 26' connection to arm 27' of gear sector member 28' is different, however, in that pierced tab member 32' mounts pin 26' with enlarged head 33' staked thereto and the pin shank slideable in slot 44 that is biased by bias hairspring 43, acting through drive mechanism including gear sector member 28', to the top of slott 44. Obviously a hairspring bias could be such as to load the pivot pin 26' to the bottom of the slot 44 just as well as the top as shown.

In the embodiment of FIG. 7 in addition to the lower slot 44, the same as with slott 44 of the FIGS. 5 and 6, an upper slot 45 is also provided in a modified connection arm 29' extending from end 23 of sensor 19. Pin 24' has an enlarged head 31' staked to pierced tab member 30' so that the shank of pin 24' may slide along slot 45. Hairspring 43 acting through drive mechanism including gear sector member 28' biases the structure such that the shank on pin 24' is biased toward the bottom of slot 45 and the shank of pin 26' toward the top of slot 44. Here again, the hairspring bias could be the opposite such as to load the pin 26' to the bottom of the slot 44 and the pin 24' to the top of the slot 45. Please note that slots 44 in the embodiments of FIGS. 5 and 6, and 7 and the slot 45 of FIG. 7 to pin interconnects could be exchanged for a structure with the replacements for pins 24' and 26' fastened to arms 29 and 27, such as used in FIG. 4, and the openings in pierced tab members 30' and 32' either elongated or enlarged relative to the shanks of pins 24' and 26' to provide substantially the same operational results.

The pin-slot sensor to drive mechanism interconnect with circular spring 25 provides for some higher frequency movement in the pin-slot interconnects of the FIGS. 5 and 6, and FIG. 7 embodiments with connecting spring force movement between sensor and motion translator to reduce friction to a minimal acceptable level.

In the gauge embodiment 10' of FIG. 8 the added mass on the gauge needle 11' is in the form of a single mass weight 46 on the needle 11' below the needle pivot center with the gauge dial face 14' a limited displacement gauge face. In the gauge embodiment 10" of FIG. 9 the added mass on the needle 11" is in the form of mass weights 47 and 48 on opposite sides of the needle pivot center. The internal mechanism drive of the embodiments of FIGS. 8 and 9 may be the same as shown for the embodiment of FIGS. 1-4 or include the additional features of the internal mechanism drive embodiment of FIGS. 5 and 6 or the internal mechanism drive embodiment of FIG. 7.

Please note further, that while the gauge embodiments described herein are directed primarily to dry pressure gauges, the same internal structues could also be employed in fluid filled gauges where additional dampening is desired to that attained with structures presented.

Whereas this inventon is herein illustrated and described with respect to several embodiments thereof, it should be realized that various changes may be made without departing from the essential contributions to the art made by the teachings hereof.

We claim:

1. In a pressure gauge with dampened indicator movement: pressure change sensor means having an operational movement end; driven mechanism means including a gauge indicator; mass weight means added to said mechanism means; looped spring interconnect means connected at a first side to the operational movement end of said pressure change sensor means, and connected at a second side to said driven mechanism means; and wherein said looped spring interconnect means is a single strand spring loop in substantially circular form.

2. The pressure gauge of claim 1, wherein said pressure sensor means is a "C" shaped Bourdon tube.

3. The pressure gauge of claim 1, wherein said pressure sensor means is a linear movement sensor.

4. The pressure gauge of claim 1, wherein said mass weight means is added weight on said gauge indicator.

5. The pressure gauge of claim 4, wherein said gauge indicator is in the form of a pivotally mounted gauge needle.

6. The pressure gauge of claim 5, wherein said added weight is in the form of a circular weight so mounted on said gauge needle as to be substantially annular to the pivotal mounting of said gauge needle.

7. The pressure gauge of claim 5, wherein said added weight is in the form of two weights mounted on said gauge needle to opposite sides of said pivotal mounting of said gauge needle.

8. The pressure gauge of claim 5, wherein said added weight is in the form of a single mass weight on said needle below the pivotal mounting of said gauge needle.

9. The pressure gauge of claim 1, wherein interconnect pin and slotting means is provided in said interconnect means.

10. The pressure gauge of claim 9, wherein said interconnect slotting means is included in the connection of the second side of said looped spring to said driven mechanism means.

11. The pressure gauge of claim 9, wherein first and second pin and slot interconnect means is included as said interconnect slotting means in the looped spring first side and second side connections.

12. The pressure gauge of claim 9, wherein bias spring means is included in said driven mechanism means biasing said interconnect pin and slotting means in one direction.

* * * * *